Figure 7:
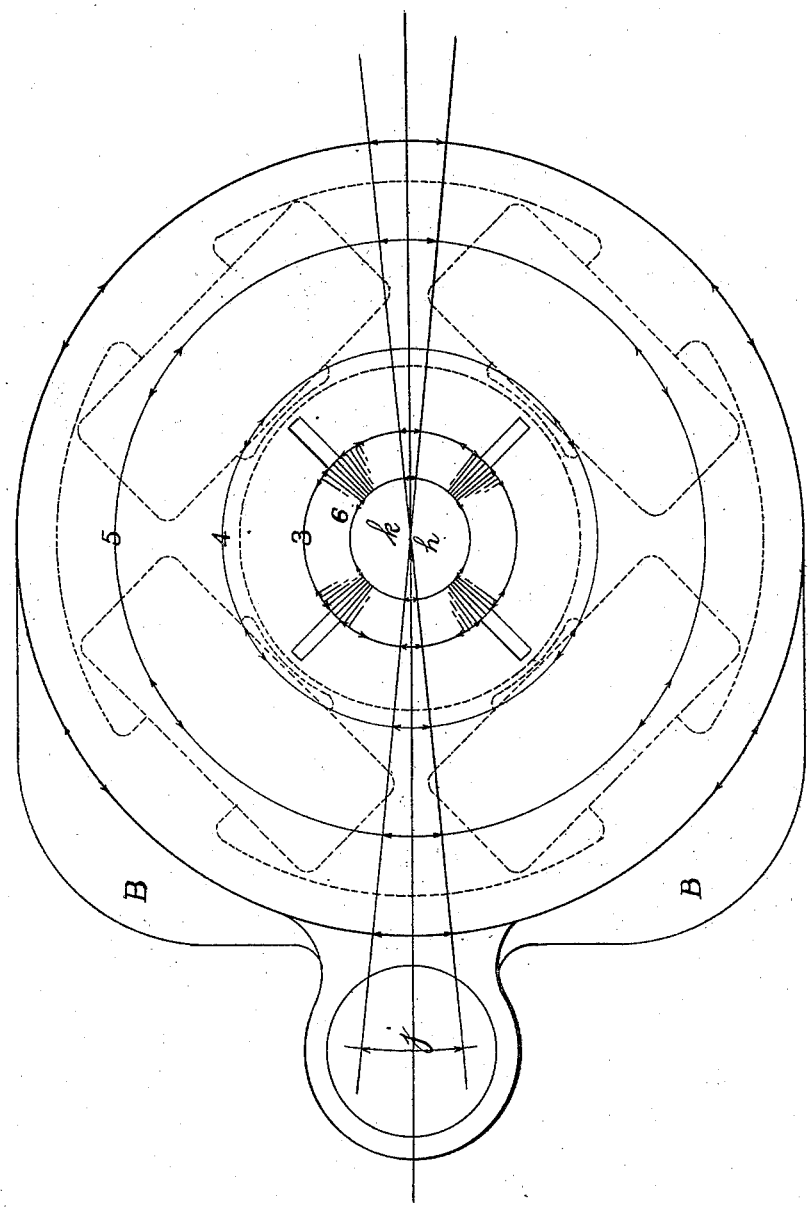

No. 744,975. PATENTED NOV. 24, 1903.
J. F. McELROY.
SUSPENSION OF DYNAMO ELECTRIC MACHINES.
APPLICATION FILED SEPT. 2, 1903.
NO MODEL. 2 SHEETS—SHEET 1.
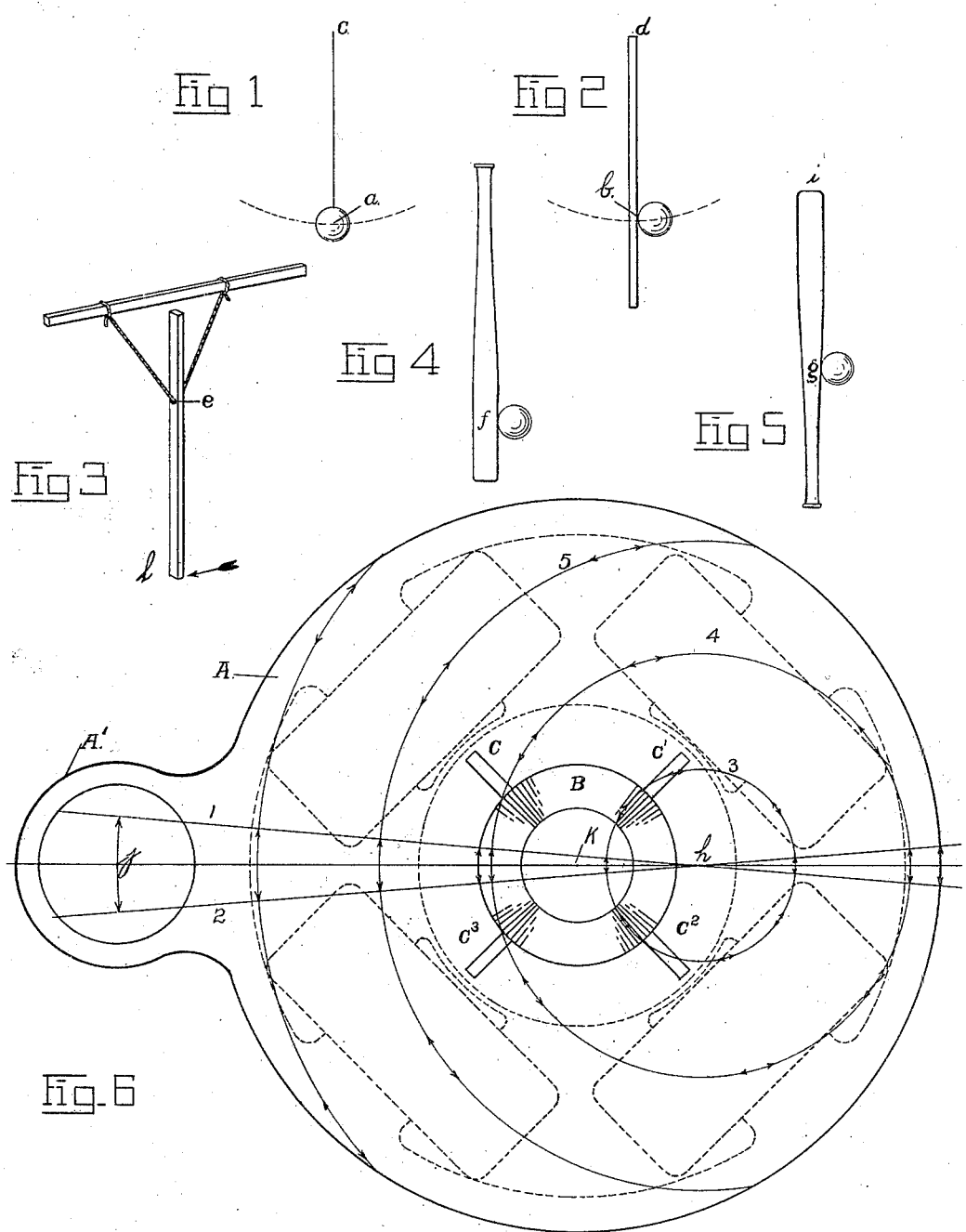

No. 744,975. PATENTED NOV. 24, 1903.
J. F. McELROY.
SUSPENSION OF DYNAMO ELECTRIC MACHINES.
APPLICATION FILED SEPT. 2, 1903.
NO MODEL. 2 SHEETS—SHEET 2.

Witnesses
L. T. Shaw
G. C. Osgrove

Inventor
James F. McElroy
by
E. M. Bentley
Atty

No. 744,975. Patented November 24, 1903.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

SUSPENSION OF DYNAMO-ELECTRIC MACHINES.

SPECIFICATION forming part of Letters Patent No. 744,975, dated November 24, 1903.

Application filed September 2, 1903. Serial No. 171,666. (No model.)

*To all whom it may concern:*

Be it known that I, JAMES F. McELROY, a citizen of the United States, residing at Albany, county of Albany, and State of New York, have invented certain new and useful Improvements in Suspension of Dynamo-Electric Machines, of which the following specification and its accompanying drawings set forth as an illustration that form of the invention which I now consider the best out of the various forms in which the principles of the invention may be embodied.

This invention relates to the suspension of motors or dynamos in situations where they are subject to jarring and vibrations. In such situations certain parts, such as the contact-brushes and oil-rings, are liable to be affected by the jarring. Thus in stationary motors and dynamos free from jarring a pressure of about one and one-quarter pounds per square inch of contact-surface is the standard pressure required to maintain carbon brushes in position on the commutator or contact-surface to which they are applied. In street-car motors, on the other hand, the standard pressure is eight to twelve pounds per square inch. This extra pressure materially increases the wear and heating and also tends to reduce the surface resistance of the carbon, upon which its virtue as a brush largely depends, and in consequence to permit a large current to flow between the commutator-bars forming the respective terminals of the coil short-circuited by the brush in the act of commutation.

By my invention I am enabled to maintain carbon brushes in railway-motors and in similarly-situated machines under substantially the same pressure that is required on stationary machines.

In brief, my invention consists in so constructing and mounting the machine that the brushes or other part subject to vibration will have such a relation to the center of oscillation of the machine that this tendency to move in response to jarring or vibration will be neutralized.

In the accompanying drawings, Figures 1 to 5 illustrate the principles on which my invention is based. Fig. 6 shows the prior mode of mounting railway motors and dynamos and also the explanation of the jarring and jumping of brushes from the commutator. Fig. 7 shows my method of preventing such separation of brushes and commutator without resorting to the heavy spring-pressure now employed.

In Fig. 1, A represents a pendulum-ball which is supposed to be supported by a cord or wire having no appreciable weight. Since the weight is all concentrated in the ball, the center $a$ of the ball will coincide with the center of oscillation, and a blow delivered against the ball in line with its center will cause the ball to swing without any local vibrations at the point of suspension $c$, and its time of oscillation will depend on the distance from the point of suspension $c$ to the center of the ball.

In Fig. 2 a rod of uniform density is suspended in the same manner; but its center of oscillation is at $b$, two-thirds of its length from the point of suspension $d$. Its period of oscillation will be the same as that of a pendulum like Fig. 1, whose length is two-thirds the length of the rod. That part of the rod above point $b$ will tend to move faster and that part below said point slower than the normal rate, which is a compromise of the two tendencies. Moreover, the rod in Fig. 2 if struck at its center of oscillation $b$ will swing bodily around the point of suspension $d$ without jarring this point of suspension; but if struck either above or below the point $b$ there will be a vibration at the point $d$. A familiar illustration of this is a base-ball bat, the center of suspension being that portion held in the hand which will "sting" the hand of the batter unless the ball hits the bat at its center of oscillation. The sting is due to the fact that the ball causes the bat to oscillate around a point not within the hand.

It is a well-known principle in physics that the center of oscillation and the center of suspension are interchangeable, so that the rod in Fig. 2 may be supported at its center of oscillation $b$ and the force may be applied at the point $d$. Fig. 3 illustrates this reversed arrangement and shows the rod suspended at its center of oscillation $e$ by means of a swinging cord from an overhead support. If the lower end of the rod $l$ be struck in the direction shown by the dart, the rod will then oscillate around the point $e$ without causing any motion in the supporting-cord. In this case $e$ becomes the center of suspension and $l$ the center of oscillation, so that $e$ is the point of no motion whenever a blow is delivered at the lower end of the rod. A blow at $l$ simply tends to cause the rod to revolve around the point $e$ without causing the point itself to move.

In Fig. 4 a base-ball bat is shown, the material thereof being more or less concentrated about its outer end so as to bring its center of oscillation $f$, where the impact of the ball occurs, more than two-thirds its length from the handle end or point of suspension. Thus there will be no sting to the hand unless the contact with the ball is at a point on either side of the point $f$.

In Fig. 5 the bat is reversed, and in this case the disposal of the material near the point of suspension at the upper end $i$ will bring the center of oscillation at the point $g$, less than two-thirds its length from the point of suspension. It thus appears that by distributing the material with respect to the point of suspension the center of oscillation may be adjusted at will nearer or farther from that point. If now in Fig. 5 the point $g$ be made the center of support, $i$ will be the center of oscillation, so that a shock or vibration communicated to the bat at the upper end $i$ will cause it to oscillate around the point $g$ and without any tendency to produce side motion at this point.

In Fig. 6 I have represented the ordinary mode of motor and dynamo suspension from a car-axle heretofore employed. The motor A is sleeved on a car-axle by rear bearings A', the center of the axle being at the point $j$. The machine is spring-supported at its end remote from the axle in ways that are well known. Regarding $j$ as the center of support, the center of oscillation of the mass of the dynamo would be the point $h$, or if these two centers be reversed and $j$ becomes the center of oscillation $h$ is the center of suspension or the center where no shocks occur when shock or jarring is produced at the center of oscillation $j$. This being the situation, let it be supposed that a blow is delivered against the axle end of the machine by the car-wheel striking a rail-joint or by other incidents common to railway-work. The motor will then tend to rock about its center of oscillation $h$. The directions of vibrations will be at right angles to the lines 1 and 2, which cross at the point $h$, and the amplitude of the vibrations is measured by the distance between these two lines measured at different distances from the point $h$. The circles drawn with different diameters about $h$ as a center show the direction of motions in the mass of the machine, and the arcs of these circles intercepted by the straight lines 1 and 2 give the proportionate amplitude of oscillation in the different circles. It will be noted that the amplitude of the oscillation in the mass of the dynamo increases in proportion to the distance from the center of oscillation $h$. Investigating in this manner the effect upon commutator-brushes $C'$ and $C^2$ bearing upon commutator B, we draw the circle 3 with a radius equal to the distance of the brushes from the center $h$. The arrows on this circle denote the direction in which the to-and-fro jarring or vibrating forces act, and their magnitude is in proportion to the length of the radius. It is evident that the forces act almost radially with respect to the commutator B, and so tend to force the brushes $C'$ and $C^2$ directly away from the commutator at one instant and directly against it at the next. In other words, the effect of the jarring of the car-axle at the point $j'$ is to make the brushes $C'$ and $C^2$ chatter up and down on the commutator B, and this effect can only be restrained by a spring-pressure on the brushes against the commutator of, perhaps, twelve pounds per square inch, whereas in the absence of such vibrations only one and one-quarter pounds would be required.

At brushes C and $C^3$ the direction of the vibratory forces is more favorable, being at a greater angle to the commutator-radius, and hence being more across the brushes and less along the length of the brushes. While the direction of vibration is more favorable for brushes C and $C^3$, the amplitude of the vibrations at these points is greater, due to their being a greater distance from the center of oscillation $h$, so that probably as great a pressure would be required upon these two brushes as upon the brushes $C'$ and $C^2$. If, however, a lower pressure should be permissible upon one brush than upon another in the same machine, yet in practical service the pressure upon all brushes in the machine would be the same, for discrimination would not be feasible.

In Fig. 7 I have shown my arrangement by which the ordinary low spring-pressure used in the brushes of stationary machines may also serve for railway motors and dynamos. The machine is supported as in Fig. 6; but by adding a greater or less mass to the rear of the machine, as at B B, between the axle-center and the commutator-center or by otherwise distributing the material of the machine, as by reducing the weight of the part of the machine opposite the car-axle, the center of oscillation is brought into coincidence with the center of the commutator, which is also the center of the armature. To secure such coincidence, the machine may be allowed to swing like a pendulum from the axle and then the material of the machine adjusted up or down until the period of oscillation is equal to that of a simple pendulum whose length is equal to the distance from the axle-center to the commutator-center. When this occurs, it will be known that the two centers will coincide. Other methods may also be employed. Applying the method of investigating the vibratory effect at definite points, as above described, it is manifest that the circles of vibration in Figs. 3, 4, and 5 are now concentric with the commutator and also with the armature and with the general structure of the machine. When so constructed, the line of movement of the brushes with respect to the commutator is substantially radial to the center of oscillation, so that the forces affecting the brushes act exactly at right angles to the commutator-radius, and jarring of the car-axle at the point $j'$ has no tendency to jar the brushes away from the commutator. Likewise the segments of which the commutator is composed are relieved of such jarring as would tend to dislocate them or distort the form of the commutator. In other words, the vibrations no longer have a component that is radial to the commutator or other parts of the machine concentric therewith; but the line in which the chattering brushes tend to move with respect to the commutator is radial to the center of oscillation and at right angles to the arcs in which vibrations around such centers occur.

What I claim as new, and desire to secure by Letters Patent, is—

1. A dynamo-electric machine adapted to be mounted in a manner which subjects it to jarring and having its material so disposed that its center of oscillation is substantially coincident with the center of the commutator.

2. A dynamo-electric machine adapted to be mounted on a car-axle or other center of support and having its material so disposed with respect to said center that its vibratory periods as a pendulum are substantially equal to those of a simple pendulum having a length equal to the distance from the said center of support to the center of the commutator.

3. A dynamo-electric machine having the line of movement of its commutator-brushes with respect to the commutator substantially radial to the center of oscillation of the machine.

4. A dynamo-electric machine having the line of movement of its commutator-brushes with respect to the commutator substantially radial to a center located at a distance from the center of support of the machine equal to the length of a pendulum having a period of vibration equal to those of the machine when swung about its center of support.

5. A dynamo-electric machine having the line of movement of its commutator-brushes with respect to the commutator substantially at right angles to the direction of the vibratory forces acting on the mass of the machine.

In witness whereof I have hereunto set my hand, before two subscribing witnesses, this 31st day of August, 1903.

JAMES F. McELROY.

Witnesses:
ERNEST D. JANSEN,
BEULAH CARLE.